(12) United States Patent
Sung et al.

(10) Patent No.: US 12,474,374 B2
(45) Date of Patent: Nov. 18, 2025

(54) PROBE HEAD AND VERTICAL PROBE CARD COMPRISING THE SAME

(71) Applicant: Silicon Future Manufacturing Company Ltd., Hsinchu (TW)

(72) Inventors: Wen-Tsung Sung, Hsinchu (TW); Tien-Chia Lee, Hsinchu (TW); Chia-Hsiang Yu, Hsinchu (TW)

(73) Assignee: SILICON FUTURE MANUFACTURING COMPANY LTD., Hsinchu (TW)

( * ) Notice: Subject to any disclaimer, the term of this patent is extended or adjusted under 35 U.S.C. 154(b) by 232 days.

(21) Appl. No.: 18/203,898

(22) Filed: May 31, 2023

(65) Prior Publication Data

US 2023/0393172 A1   Dec. 7, 2023

(30) Foreign Application Priority Data

Jun. 1, 2022   (TW) .................................. 111120511

(51) Int. Cl.
    *G01R 1/067*   (2006.01)
    *G01R 1/073*   (2006.01)
(52) U.S. Cl.
    CPC ..... *G01R 1/06722* (2013.01); *G01R 1/07378* (2013.01)
(58) Field of Classification Search
    CPC .................. G01R 1/06722; G01R 1/07378
    See application file for complete search history.

(56) References Cited

U.S. PATENT DOCUMENTS 4,510,445 A * 4/1985 Kvaternik .......... G01R 1/07378
                                                324/754.02
5,850,148 A * 12/1998 Nam .................. G01R 1/07314
                                                324/754.16

(Continued)

FOREIGN PATENT DOCUMENTS

TW       201544815 A    12/2015
TW          I603090 B   10/2017

(Continued)

*Primary Examiner* — Paresh Patel
(74) *Attorney, Agent, or Firm* — Birch, Stewart, Kolasch & Birch, LLP (57) ABSTRACT

The present invention provides a probe head, comprising: an upper guide plate with a first through hole; a lower guide plate with a second through hole; and a probe structure body with a first end portion, a second end portion and a needle body. The upper guide plate and the lower guide plate jointly define an inner accommodation space. The first end portion is disposed in the first through hole, and the second end portion is disposed in the second through hole. The needle body is located between the first end portion and the second end portion, and is accommodated in the inner accommodation space. The second end portion has a fixed portion positioned on the lower guide plate, and the fixed portion has no degree of freedom to move along the penetrating direction of the second through hole. The upper section of the probe structure body relative to the fixed portion has a first spring constant, and the lower section of the probe structure body relative to the fixed portion has a second spring constant. The present invention also provides a vertical probe card including the above-mentioned probe head.

15 Claims, 9 Drawing Sheets

(56) References Cited

U.S. PATENT DOCUMENTS

| | | | |
|---|---|---|---|
| 2008/0238408 A1 | 10/2008 | McQuade | |
| 2008/0238452 A1* | 10/2008 | McQuade | G01R 1/0675 |
| | | | 324/755.01 |
| 2010/0231249 A1* | 9/2010 | Dang | G01R 1/0675 |
| | | | 324/750.29 |
| 2012/0019275 A1* | 1/2012 | Dehmel | G01R 1/07328 |
| | | | 324/754.03 |
| 2014/0352460 A1* | 12/2014 | Kuo | G01R 1/07357 |
| | | | 73/866.5 |
| 2017/0242057 A1* | 8/2017 | Mori | G01R 1/07357 |
| 2018/0267083 A1 | 9/2018 | Wei et al. | |
| 2020/0011896 A1 | 1/2020 | Chen et al. | |
| 2020/0011898 A1 | 1/2020 | Chen et al. | |
| 2022/0214380 A1 | 7/2022 | Lin et al. | |

FOREIGN PATENT DOCUMENTS

| | | |
|---|---|---|
| TW | 202006367 A | 2/2020 |
| TW | I728736 B | 5/2021 |
| TW | I763506 B | 5/2022 |

\* cited by examiner

PROBE HEAD AND VERTICAL PROBE CARD COMPRISING THE SAME

FIELD OF INVENTION

The present invention relates to a probe head and a vertical probe card comprising the same. Specifically, the present invention relates to a probe head with an upper section and a lower section having different spring constants and a vertical probe card comprising the same.

BACKGROUND

In present day industries of electronics manufacturing or microelectromechanical technology, electrical testing needs to be conducted on devices like semiconductor integrated circuit wafers before procedures like dicing or packaging. Continued progress of subsequent processes on defective products with electrical flaws can be hereby reduced or avoided, thus promoting the yield of finished products. As such, to conduct electrical testing, probe cards with probe heads may be used to connect devices under test (e.g., semiconductor integrated circuit wafers described above) and testing devices or testing instruments that send testing signals. However, when connecting to devices under test and testing devices or testing instruments respectively on both ends, probes in probe heads may have different physical requirements or connection conditions, and it is difficult for the probes to satisfy these different physical requirements or connection conditions at the same time.

SUMMARY

TECHNICAL SOLUTION ADOPTED TO SOLVE THE PROBLEM

In order to solve the problem above, one embodiment according to the present invention provides a probe head, comprising: an upper guide plate with a first through hole; a lower guide plate disposed below the upper guide plate with a second through hole, wherein the upper guide plate and the lower guide plate jointly define an inner accommodation space, and the inner accommodation space connects the first through hole and the second through hole; and a probe structure body. The probe structure body includes: a first end portion disposed in the first through hole and extending away from the lower guide plate to stick out of the upper guide plate; a second end portion disposed in the second through hole and extending away from the upper guide plate to stick out of the lower guide plate; and a needle body located between the first end portion and the second end portion and accommodated in the inner accommodation space. The second end portion has a fixed portion, the fixed portion being positioned on the lower guide plate and having no degree of freedom to move along the penetrating direction of the second through hole. An upper section of the probe structure body closer to the upper guide plate relative to the fixed portion has a first spring constant, and a lower section of the probe structure body farther from the upper guide plate relative to the fixed portion has a second spring constant different from the first spring constant.

Another embodiment according to the present invention provides a vertical probe card, comprising: a probe head as described above; a space transformer prepress-connected with the upper guide plate; and a circuit board located on the space transformer and prepress-connected with the upper guide plate through the space transformer.

Advantageous Effects with Reference to Prior Art

The probe head and the vertical probe card provided in accordance with various embodiments of the present invention may cause the probe structure body to have a section with a first spring constant and another section with a second spring constant. The first end portion and the second end portion of the probe structure body may hereby respectively employ more suitable spring constants corresponding to physical requirements of connection conditions of the devices or components that need to be prepressed or connected. Operation convenience, stability or reliability of prepressing or connection may therefore be improved, and wherein it may be less likely for the prepressing or connection of one end portion to influence the state of the other end portion.

DETAILED DESCRIPTION

Various embodiments will be described hereinbelow, and spirits and principles of the present invention shall be easily understood by a person of ordinary skill in the art referring to the description alongside the drawings. However, although some certain embodiments will be specifically illustrated herein, these embodiments are merely exemplary, and are not to be construed in the limited or exhaustive sense in all respects. Therefore, for a person of ordinary skill in the art, various changes and modifications to the present invention shall be obvious and easily achieved without departing from the spirits and principles of the present invention.

Figure 1:
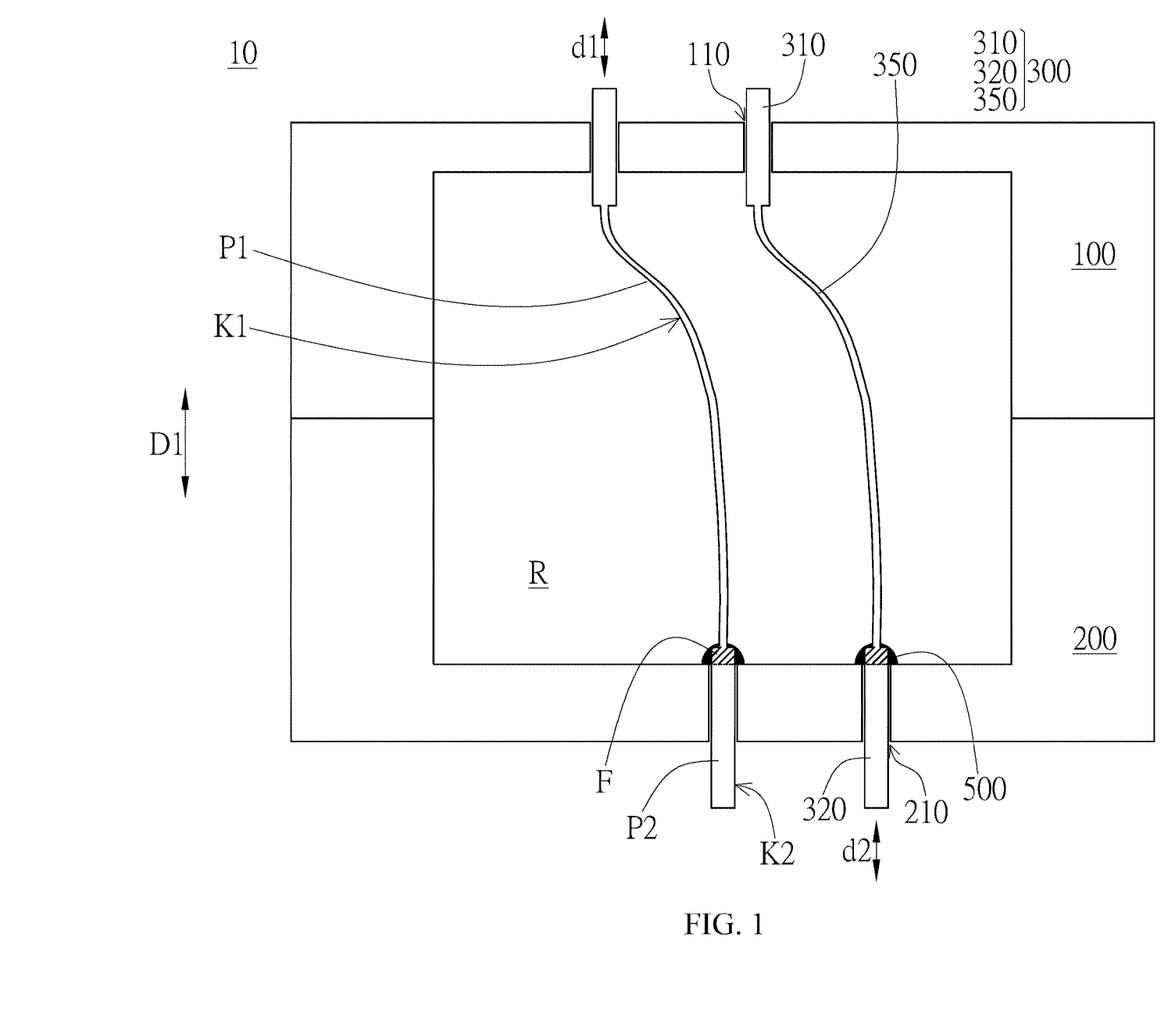
FIG. 1 is a schematic diagram of a probe head according to a first embodiment of the present invention.
Figure 2:
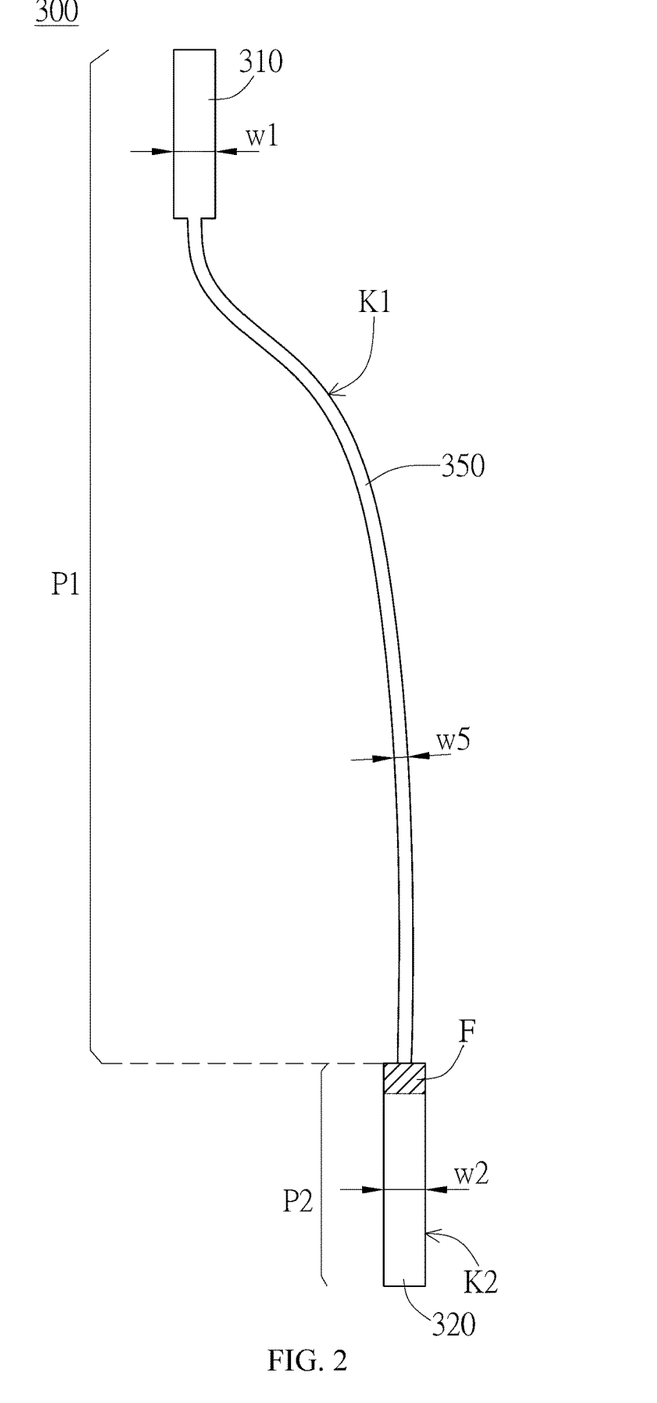
FIG. 2 is an enlarged schematic diagram of a probe structure body of the probe head according to the first embodiment of the present invention.

Refer to FIG. 1 and FIG. 2 displaying an enlarged probe structure body 300 of FIG. 1, one embodiment according to the present invention provides a probe head 10, comprising: an upper guide plate 100, a lower guide plate 200 disposed below the upper guide plate 100, and probe structure bodies 300 disposed through the upper guide plate 100 and the lower guide plate 200. In detail, the upper guide plate 100 may have a plurality of first through holes 110, and the lower guide plate 200 may have a plurality of second through holes 210 (FIG. 1 merely exemplarily shows two first through holes 110 and two second through holes 210 for simplicity, but actual feasible number are not limited hereto). The upper guide plate 100 and the lower guide plate 200 jointly define an inner accommodation space R, and the inner accommodation space R connects the first through holes 110 and the second through holes 210. As such, the probe structure bodies 300 described above may include first end portions 310, second end portions 320, and needle bodies 350 located between the first end portions 310 and the second end portions 320. The first end portions 310 may be disposed corresponding to the first through holes 110, the second end portions 320 may be disposed corresponding to the second through holes 210, and the needle bodies 350 may be accommodated in the inner accommodation space R.

According to some embodiments, the first end portions 310 and the second end portions 320 may be structure portions having relatively larger thicknesses and configured to respectively connect devices or components, and the needle bodies 350 may be structure portions having relatively smaller thicknesses and configured to respectively connect the first end portions 310 and the second end portions 320.

As above, the first end portions 310 may extend away from the lower guide plate 200 to stick out of the upper guide plate 100, to be connected with devices or components like space transformers, circuit boards, testing instruments, etc. In addition, the second end portions 320 may extend away from the upper guide plate 100 to stick out of the lower guide plate 200, to be connected with devices or components under test such as semiconductor integrated circuit wafers. The second end portions 320 may have parts as fixed portion F, and the fixed portions F are positioned on the lower guide plate 200, so that the fixed portions F have no degree of freedom to move along the penetrating direction d2 of the second through holes 210.

In detail, various means or structures may be applied, so that a part of the second end portions 320 is fixed at least in the penetrating direction d2 relative to the lower guide plate 200, and the part of the second end portions 320 being fixed is a fixed portion F. For example, as shown in FIG. 1, the fixed portion F and the lower guide plate 200 may be adhered and fixed by a fixing glue 500, so that the fixed portion F cannot move back and forth along the penetrating direction d2 of the second through holes 210. However, what described above is merely an example, and means for positioning the fixed portions F of the second end portions 320 on the lower guide plate 200 is not limited hereto. In addition, according to some embodiments, in light of differences in means for positioning the fixed portions F and the lower guide plate 200, the fixed portions F may retain the degree of freedom to move in directions other than the penetrating direction d2 relative to the lower guide plate 200. For example, the fixed portions F may have the degree of freedom to move in a direction perpendicular to the penetrating direction d2, but cannot move along the second through holes 210. In addition, the fixed portions F may also be completely fixed on the lower guide plate 200, without degree of freedom in any direction.

According to this embodiment, since the fixed portions F are positioned on the lower guide plate 200 and refrained from moving along the penetrating direction d2 of the second through holes 210, upper sections P1 of the probe structure bodies 300 closer to the upper guide plate 100 relative to fixed portions F may have first a spring constant K1, and lower sections P2 farther from the upper guide plate 100 relative to the fixed portions F may have a second spring constant K2. As above, the second spring constant K2 may be different from the first spring constant K1. That is, based on the fixed portions F being fixed in the penetrating direction d2, the probe structure bodies 300 may be divided into different sections having different spring constants. Therefore, upper sections P1 having the first spring constant K1 may be disposed aiming at physical requirements or connection conditions needed for the upper sections P1 comprising the first end portions 310, and lower sections P2 having the second spring constant K2 may be disposed aiming at physical requirements or connection conditions needed for the lower sections P2 comprising the second end portions 320.

According to some embodiments of the present invention, the second spring constant K2 of the lower sections P2 may be greater than the first spring constant K1 of the upper sections P1. For example, the first end portions 310 in the upper sections P1 may be configured to prepress-connect with devices or components like space transformers or circuit boards, and therefore may need a lower spring constant.

According to some embodiments of the present invention, the probe structure bodies 300 may be monolithic in practice. For example, a probe structure body 300 may be a conductive structure body such as a continuous monolithic metal. As above, by fixing a part of a probe structure body 300 such as a fixed portion F on the lower guide plate 200, the continuous monolithic probe structure body 300 may have different sections with different spring constants, for respectively corresponding to devices to be connected above the upper guide plate 100 or devices to be connected below the lower guide plate 200.

As described above, according to some embodiments as shown in FIG. 2, the upper section P1 may comprise parts of the probe structure body 300 including those above the fixed portion F, and may relatively move in the first through hole 110 and the inner accommodation space R. For example, the first end portion 310 of the upper section P1 may relatively move along the first through hole 110, so that the needle body 350 may move in the inner accommodation space R. That is, the first end portion 310 of the upper section P1 may at least have the degree of freedom to move along the penetrating direction d1 of the first through hole 110, and may move relative to the upper guide plate 100. In addition, the lower section P2 may comprise parts of the probe structure body 300 including those below the fixed portion F, and cannot relatively move in the second through hole 210. Therefore, although the upper section P1 and the lower section P2 are connected and may even be monolithic, the upper section P1 and the lower section P2 may respectively have different spring constants and degrees of freedom, to match objects or conditions of expected prepressings or connections.

As above, when pressing or moving the upper section P1, the lower section P2 will not be affected to move in association. Contrariwise, when pressing or moving the lower section P2 in directions other than the penetrating direction d2, the upper section P1 will not be affected to move in association.

Further, sizes or hardnesses or the like of the upper section P1 and the lower section P2 may be adjusted and changed in accordance with spring constants expected to be needed. For example, according to some embodiments, the width of at least a part of the upper section P1 may be made less than the width of the lower section P2. For instance, as shown in FIG. 1 and FIG. 2, the fixed portion F may be located between the needle body 350 and the second end portion 320. As above, the width w5 of the needle body 350 may be less than the width w2 of the second end portion 320. Further, according to some embodiments, the width w5 of the needle body 350 and the width w1 of the first end portion 310 may both be less than the width w2 of the second end portion 320. As such, even in monolithic aspects manufactured with the same material, the hardness of the lower section P2 of the probe structure body 300 may be greater than the hardness of the upper section P1; for example, the Young's modulus Y2 of the lower section P2 may be greater than the Young's modulus Y1 of the upper section P1, and the second spring constant K2 of the lower section P2 may be greater than the first spring constant K1 of the upper section P1.

According to some embodiments, the relation of the first spring constant K1 and the second spring constant K2 may be K1<0.5×K2. However, the above is merely an example, and with the upper section P1 and the lower section P2 respectively having the first spring constant K1 and the second spring constant K2, the present invention not limited hereto.

Furthermore, according to some embodiments, the hardness of the lower guide plate 200 may also be greater than the hardness of the upper guide plate 100. For example, when manufactured with the same material, the thickness of the lower guide plate 200 in the penetrating direction d1 may be thicker than the thickness of the upper guide plate 100 in the penetrating direction d2, so that the Young's modulus Y2' of the lower guide plate 200 may be greater than the Young's modulus Y1' of the upper guide plate 100. However, this is merely an example, and the means and methods to make the upper guide plate 100 and the lower guide plate 200 differ in hardness are not limited hereto.

In the aspect shown in FIG. 1 and FIG. 2 above, the fixed portion F is located on the first end portion 310 at the border of the first end portion 310 and the needle body 350. That is, the fixed portion F is located at the endpoint of the first end portion 310 closest to the second end portion 320. However, the present invention is not limited hereto, and as long as the fixed portion F of the first end portion 310 is made fixed relative to the lower guide plate 200 in the penetrating direction d2, then the fixed portion F is not necessarily located at the endpoint of the first end portion 310 closest to second end portion 320. For example, please refer to FIG. 3 and FIG. 4, a probe head 20 according to some embodiments of the present invention, the fixed portion F may be located on the middle section of the first end portion 310 in practice. For example, on the middle section of the first end portion 310 in the second through hole 210, the fixed portion F and the lower guide plate 200 may be adhered and fixed by a fixing glue 500. Therefore, in this embodiment, the lower section P2 comprising the fixed portion F relative to below the fixed portion F and having the second spring constant K2 may not comprise the entire second end portion 320.

Figure 3:
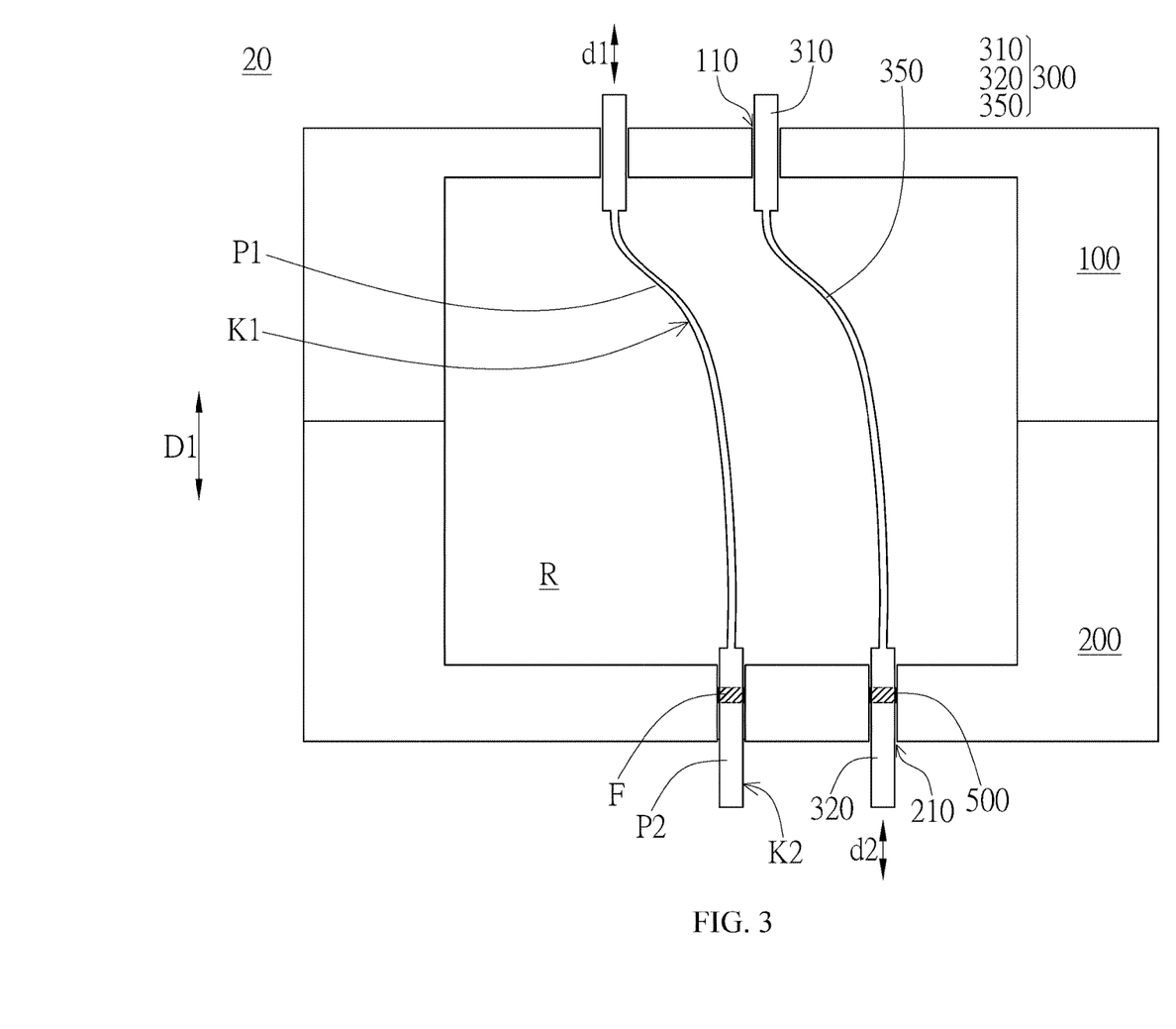
FIG. 3 is a schematic diagram of a probe head according to a second embodiment of the present invention.
Figure 4:
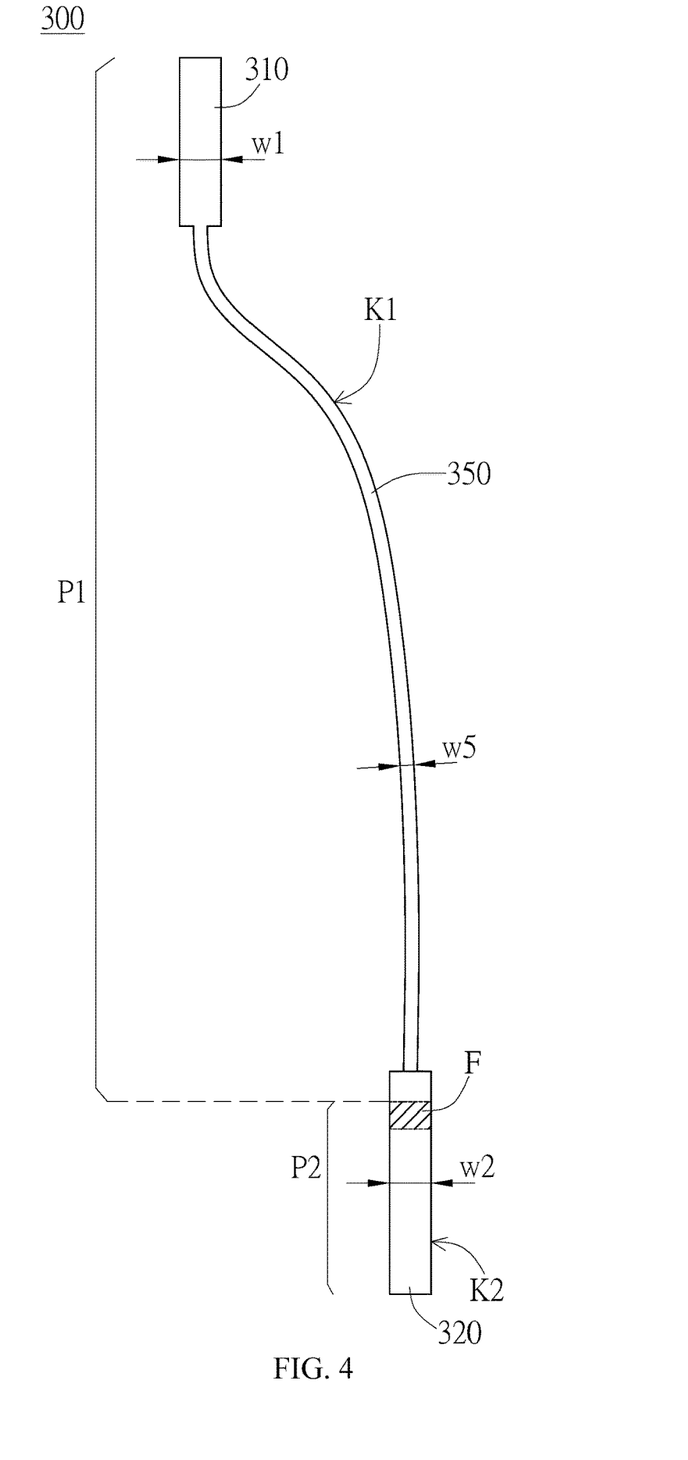
FIG. 4 is an enlarged schematic diagram of a probe structure body of the probe head according to the second embodiment of the present invention.

Hereinabove, only the difference according to the embodiment shown in FIG. 3 and FIG. 4 and the embodiment shown in FIG. 1 and FIG. 2 is specifically illustrated, and other same or similar details will not be repeated here.

In addition, although the embodiments described above both show fixing the fixed portion F of the second end portion 320 by the fixing glue 500, but other embodiments according to the present invention are not limited hereto. For example, please refer to the aspect shown in FIG. 5 and FIG. 6, a probe head 30 according to some embodiments, the fixed portion F of the second end portion 320 may itself have a structural form capable of fitting and fastening to the lower guide plate 200 in practice, and therefore the degree of freedom of the lower section P2 to move in the penetrating direction d2 may be limited by the fixed portion F fitting and fastening to the lower guide plate 200.

Figure 5:
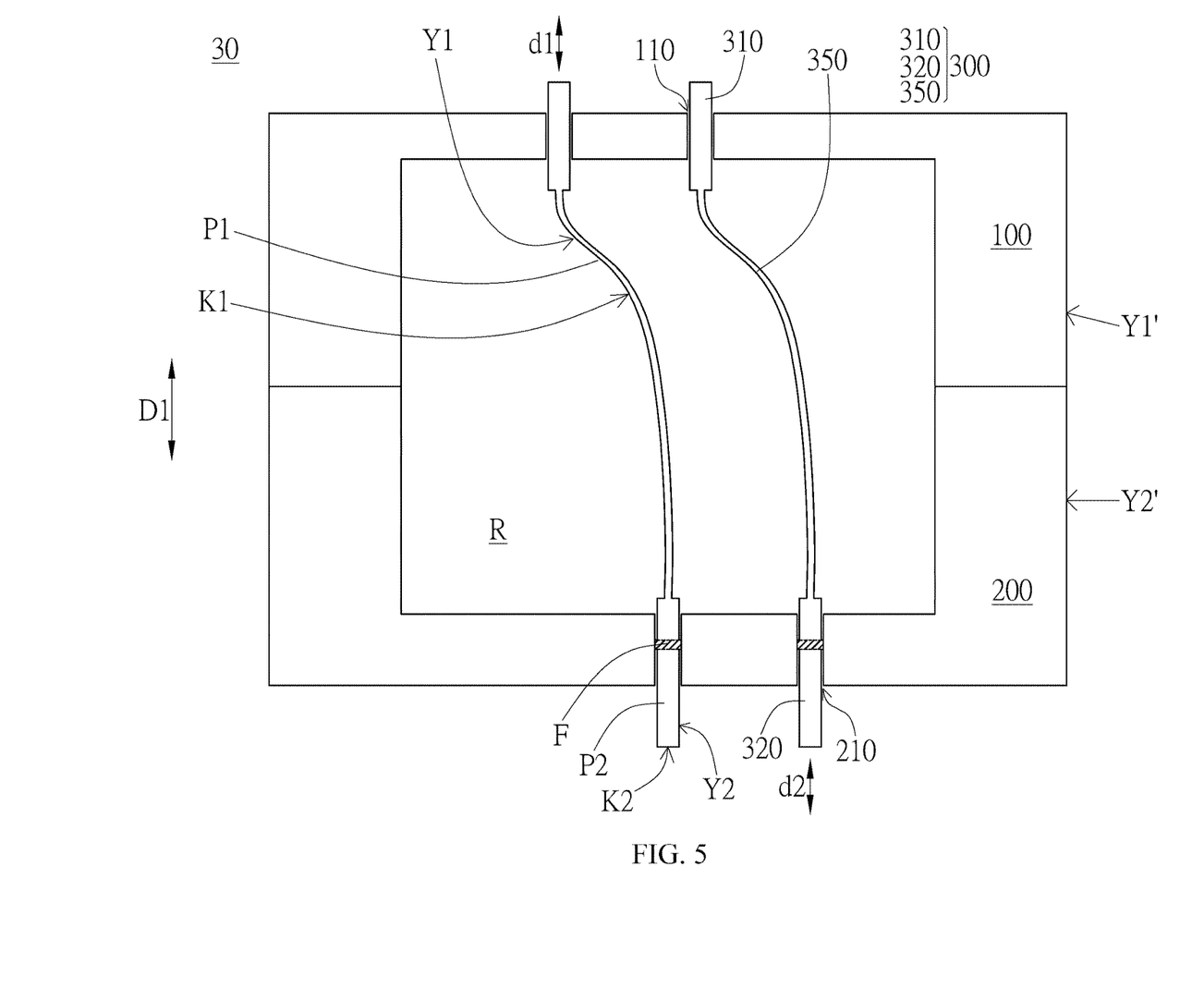
FIG. 5 is a schematic diagram of a probe head according to a third embodiment of the present invention.
Figure 6:
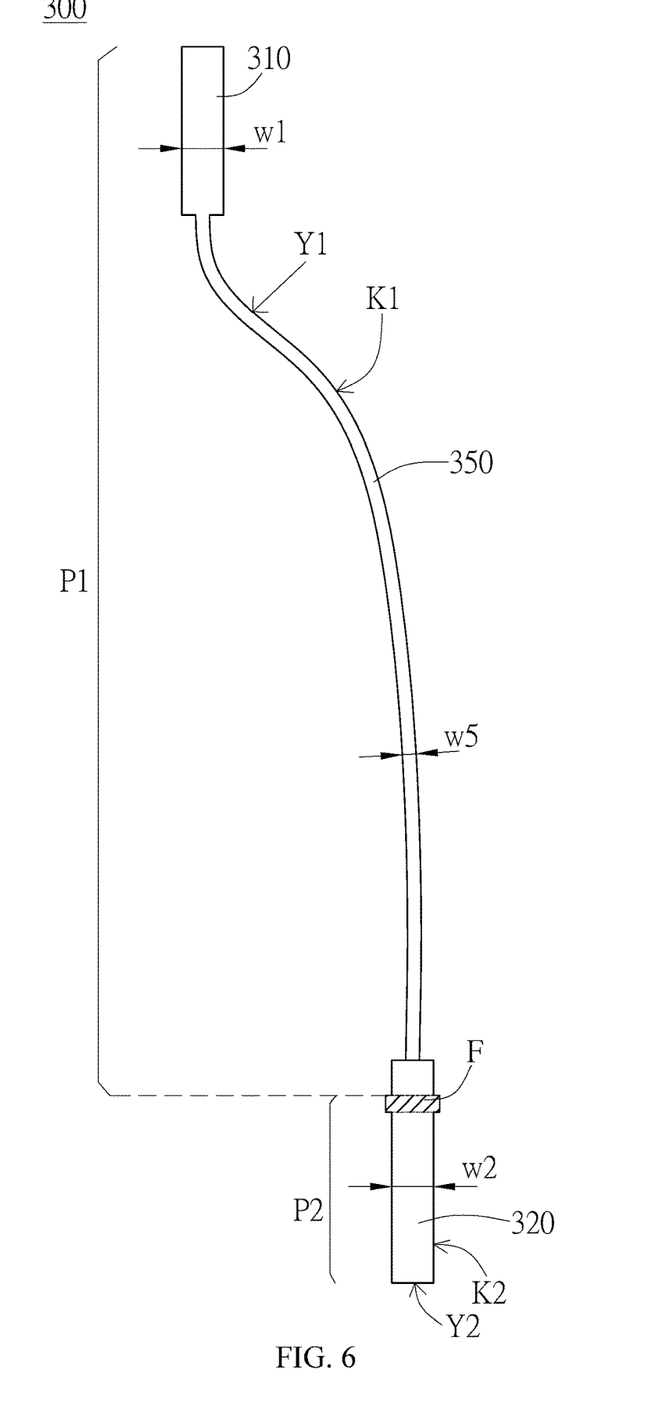
FIG. 6 is an enlarged schematic diagram of a probe structure body of the probe head according to the third embodiment of the present invention.

As described above, the structures or means that may make the fixed portion F of the second end portion 320 fasten and connect to the lower guide plate 200 are not limited to the aspects disclosed by the specification and the drawings. In limiting the degree of freedom of the lower section P2 comprising the fixed portion F therein to move in the penetrating direction d2 based on the fixed portion F being positioned on the lower guide plate 200, the upper section P1 may be made to have a first spring constant K1, and the lower section P2 may be made to have a second spring constant K2 different from the first spring constant K1. Therefore, regardless of the structure or means employed, it may adjust so that the first end portion 310 of the upper section P1 may have a first spring constant K1 needed for corresponding to devices or components expected to connect, and the second end portion 320 of the lower section P2 may have a second spring constant K2 needed for corresponding to devices or components expected to connect.

Figure 7:
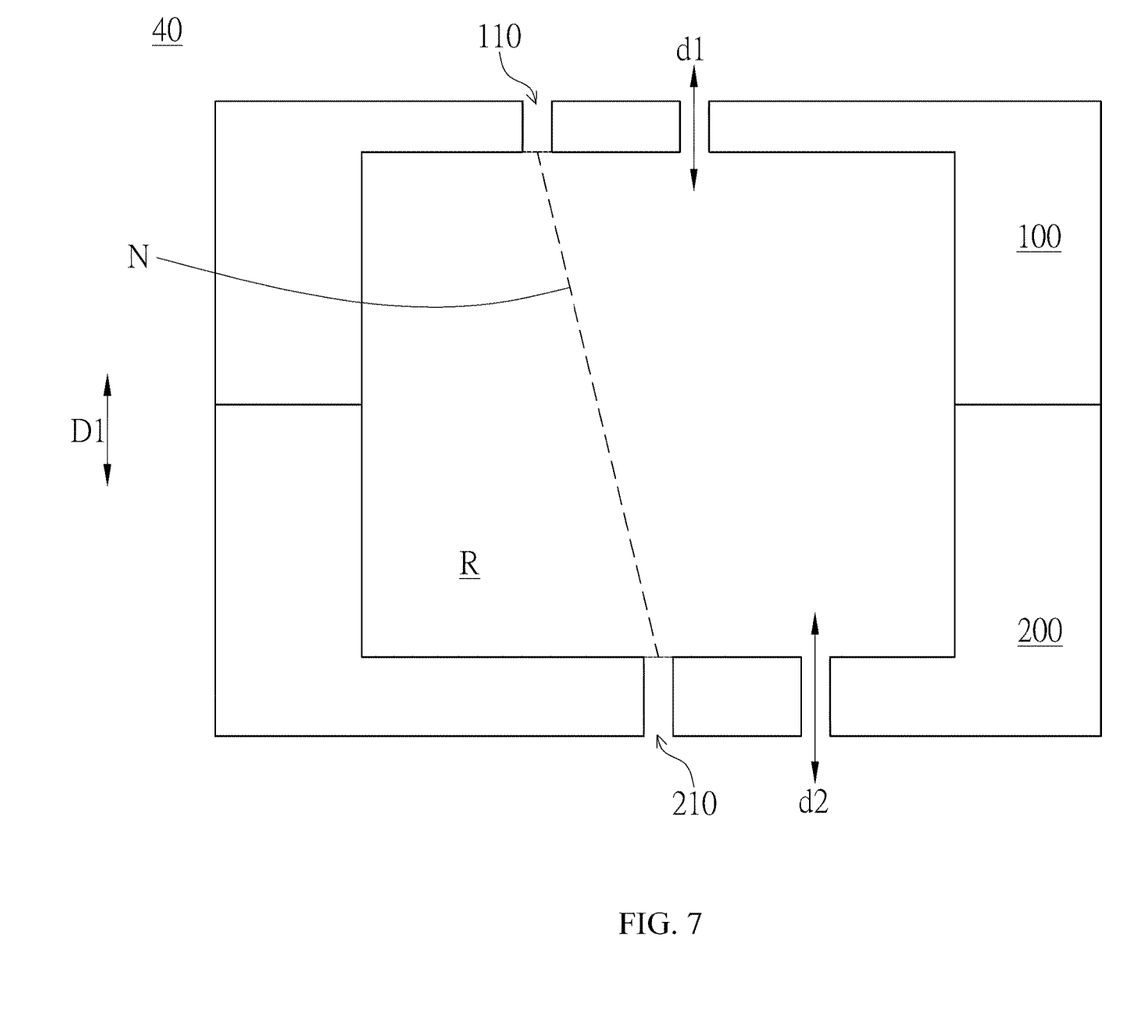
FIG. 7 is a schematic diagram of corresponding through hole pre-displacement or dislocation in a probe head according to a fourth embodiment of the present invention.

Next, refer to the probe head 40 of FIG. 7, in the embodiments described above, the connection line N of the first through hole 110 and the second through hole 210 passed by the same probe structure body 300 may be pre-displaced or dislocated in advance. Specifically, the upper guide plate 100 may be disposed on the lower guide plate 200 in a first direction D1, and the connection line N of the first through hole 110 and the second through hole 210 may be not parallel to the first direction D1. For example, the connection line N from the center point of the first through hole 110 aligned to the side edges of the surface of the upper guide plate 100 facing the inner accommodation space R to the center point of the second through hole 210 aligned to the side edges of the surface of the lower guide plate 200 facing the inner accommodation space R may be pre-displaced or dislocated in advance. As such, when prepressing or connecting the first end portion 310 or the second end portion 320 of the probe structure body 300, the potentially resultant stress or pressure on the first end portion 310 or the upper guide plate 100 may be made not to impact the second end portion 320 or the lower guide plate 200 on the other side, or vice versa. However, this is merely an example, and provided that the material and structure and the like can bear the stress or pressure of prepressing or connection, or the first spring constant K1 and the second spring constant K2 can be relatively adjusted so that the stress or pressure can be buffered or relieved upon prepressing or connection, according to other embodiments of the present invention, the first through hole 110 and the second through hole 210 passed by the same probe structure body 300 may also be made aligned to each other; for example, aligned in the first direction D1 where the upper guide plate 100 and the lower guide plate 200 stack. As described above, provided that different sections of the probe structure body 300 have the first spring constant K1 and the second spring constant K2, other embodiments of the present invention may have various changes.

Figure 8:
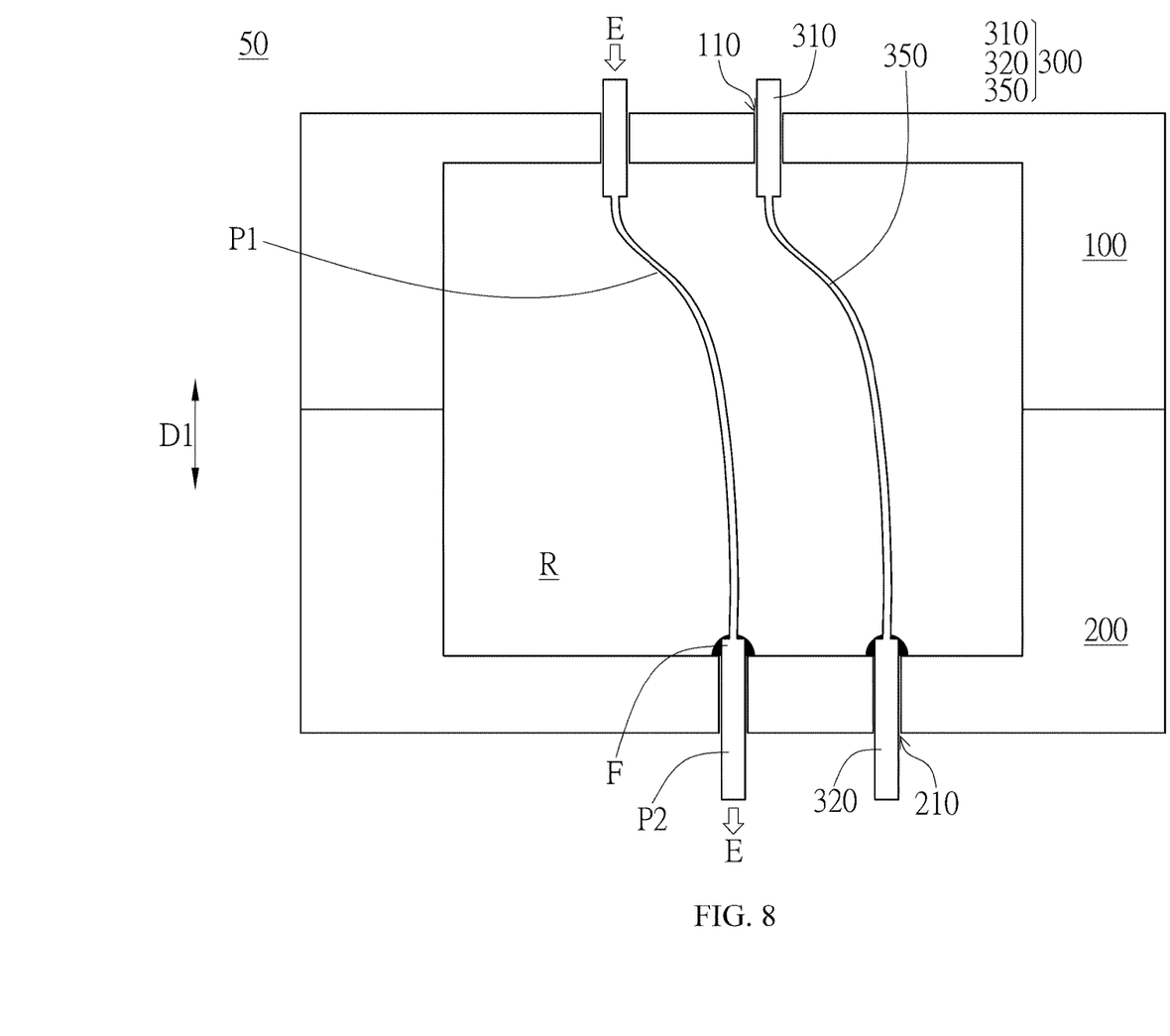
FIG. 8 is a schematic diagram of electrical signal delivery by a probe structure body of a probe head according to a fifth embodiment of the present invention.

After connecting devices or components respectively on both ends, the probe structure body 300 shown in embodiments referring to FIG. 1 to FIG. 7 may be configured to deliver electrical signals. For example, refer to FIG. 8, when a probe head 50 similar to the aspect shown in FIG. 1 and FIG. 2 is applied in practice to connecting devices or components, an electrical signal E transmitted from the first end portion 310 can be delivered from the first end portion 310 to the second end portion 320. For instance, if the first end portion 310 of the probe structure body 300 abuts and connects a space transformer, and the second end portion 320 of the probe structure body 300 abuts and connects a semiconductor integrated circuit wafer under test, then the electrical signal E for testing transmitted by testing instruments connected by the space transformer may be delivered through the probe structure body 300 and transmitted to the second end portion 320 to be in turn delivered to the semiconductor integrated circuit wafer. As above, in the probe structure body 300 according to various embodiments of the present invention, although the upper section P1 and the lower section P2 have different first spring constant K1 and second spring constant K2, but the electrical signal E may be delivered through the upper section P1 followed by the lower section P2, and delivered from the first end portion 310 to the second end portion 320. In addition, although not particularly shown here, but the electrical signal E may also be delivered through the lower section P2 followed by the upper section P1, and delivered from the second end portion 320 to the first end portion 310 in reverse.

As described above, the probe heads according to various embodiments of the present invention may be applied to many devices, for example may be disposed in vertical probe cards. For instance, refer to FIG. 9, a probe head 60 the same as or similar to the probe heads of various embodiments described above may be disposed in a vertical probe card 1000. In detail, the vertical probe card 1000 may comprise: the probe head 60; a space transformer 80 prepress-connected with the upper guide plate 100; and a circuit board 90 located above the space transformer 80, prepress-connected with the upper guide plate 100 through the space transformer 80. As above, based on the characteristic that the upper section P1 and the lower section P2 of the probe head 60 of the probe structure body 300 have different spring constants, a device like the space transformer 80 may be prepress-connected first at the upper guide plate 100 of the probe head 60 in advance, without influencing the state of the lower section P2. For example, in this case, at least a part of the upper section P1 having a first spring constant K1 may exhibit a buckled state due to pressure. However, even if at least a part of the upper section P1 exhibits a buckled state, the lower section P2 of the probe structure body 300 may still not exhibit a buckled state. Further, when prepress-connecting first a device like the space transformer 80 on the probe head 60, the probe structure body 300 is also more likely to stably remain in the probe head 60 with detachment or dislocation.

Figure 9:
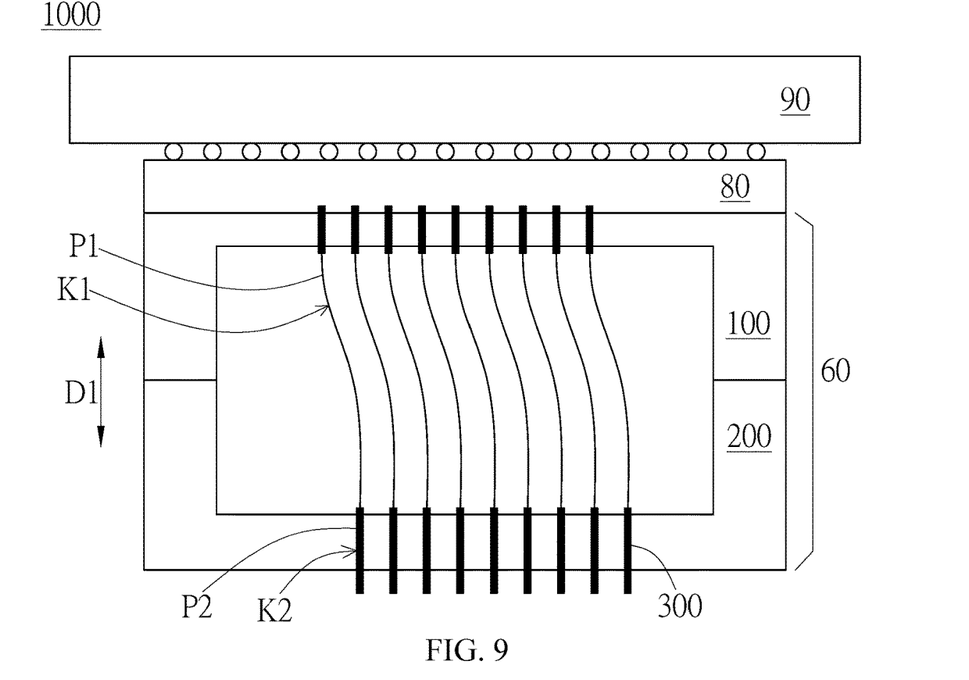
FIG. 9 is a schematic diagram of a vertical probe card according to a sixth embodiment of the present invention.

According to some embodiments, since the hardness of the lower guide plate 200 may be greater than the hardness of the upper guide plate 100, for example the Young's modulus Y2' of the lower guide plate 200 may be greater than the Young's modulus Y1' of the upper guide plate 100, so even if the upper guide plate 100 of the probe head 60 prepress-connects a device first so that the upper guide plate 100 is slightly deformed, the lower guide plate 200 may also keep undeformed or deformed to a lesser degree. Therefore, the lower section P2 of the probe structure body 300 may be relatively stably fixed on the lower guide plate 200.

As above, the described vertical probe card 1000 may further make the probe structure body 300 link with devices or components under test on the side of the lower guide plate 200, thus be able to conduct preset electrical transmission or testing.

Figure 10:
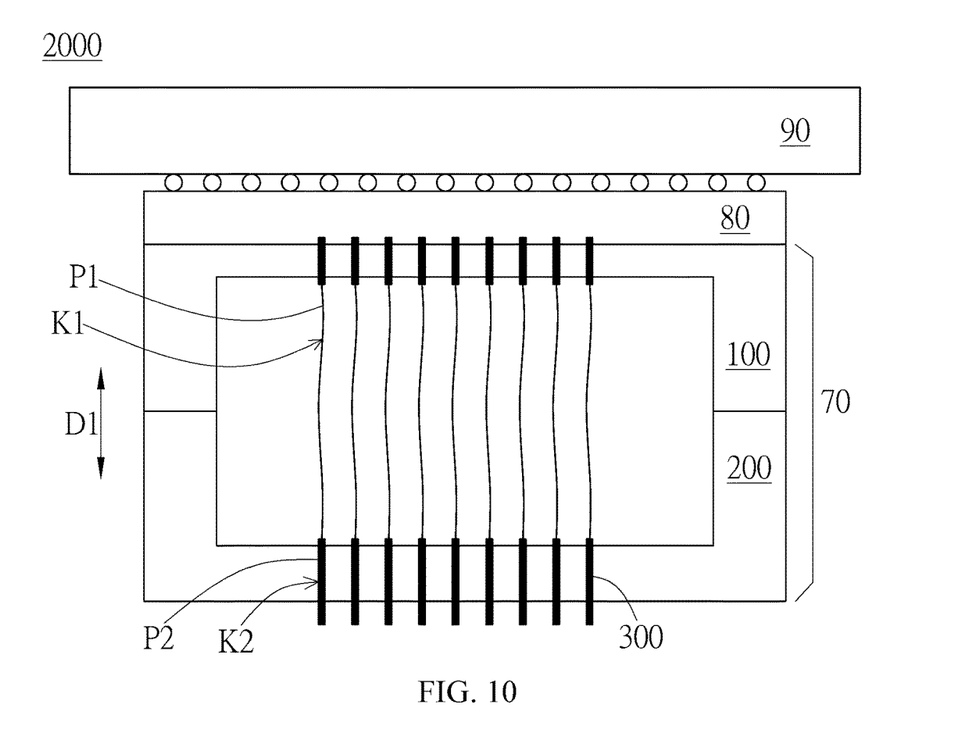
FIG. 10 is a schematic diagram of a vertical probe card according to a seventh embodiment of the present invention.

In addition, refer to FIG. 10, according to one embodiment, a probe head 70 having the aspect of aligning to through holes on both ends of the upper guide plate 100 and the lower guide plate 200 passed by the same probe structure body 300 along the first direction D1, may also be applied to a vertical probe card 2000 similar to FIG. 9. As described above, the various probe heads according to various embodiments of the present invention may all be respectively applied in vertical probe cards or similar devices or components, and provided that the probe structure body 300 has an upper section P1 with a first spring constant K1 and a lower section P2 with a second spring constant K2, the various embodiments according to the present invention may have various changes in structure and configuration.

In summary, according to various embodiments of the present invention, different sections of probe structure bodies of the probe heads and vertical probe cards may have different spring constants, so that end portions corresponding to different devices or components to be connected may have respective spring constants. Therefore, instead of using one single spring constant to correspond to different devices or components to be connected, the spring constant may be adjusted more flexibly in accordance with needed physical requirements or connection conditions coordinating with devices or components to be connected. Therefore, applicable scenarios and contact characteristics of probe heads and vertical probe cards may be increased or improved, thus promoting flexibility, stability and reliability of electrical transmission or electrical testing.

What described hereinabove are merely some preferred embodiments of the present invention. It should be noted that without departing from the spirits and principles of the present invention, various changes and modifications may be conducted on the present invention. It should be understood by a person of ordinary skill in the art that the present invention is defined by the appended claims, and in compliance with the intention of the present invention, none of the various changes like possible replacements, combinations, modifications and adaptations would exceed the scope of the present invention defined by the appended claims.

What is claimed is:
1. A probe head, comprising:
an upper guide plate with a first through hole;
a lower guide plate disposed below the upper guide plate with a second through hole, wherein the upper guide plate and the lower guide plate jointly define an inner accommodation space, and the inner accommodation space connects the first through hole and the second through hole; and
a probe structure body including:
a first end portion disposed in the first through hole and extending away from the lower guide plate to stick out of the upper guide plate;
a second end portion disposed in the second through hole and extending away from the upper guide plate to stick out of the lower guide plate; and
a needle body located between the first end portion and the second end portion and accommodated in the inner accommodation space,
wherein the second end portion has a fixed portion, the fixed portion being positioned on the lower guide plate and having no degree of freedom to move along the penetrating direction of the second through hole, so that the second end portion cannot relatively move along the penetrating direction in the second through hole, and wherein an upper section of the probe structure body closer to the upper guide plate relative to the fixed portion has a first spring constant, and a lower section of the probe structure body farther from the upper guide plate relative to the fixed portion has a second spring constant different from the first spring constant.

2. The probe head of claim 1, wherein the fixed portion is completely fixed on the lower guide plate, without degree of freedom in any direction.

3. The probe head of claim 1, wherein the width of at least a part of the upper section is less than the width of the lower section.

4. The probe head of claim 1, wherein the fixed portion is located between the needle body and the second end portion, and the width of the needle body is less than the width of the second end portion.

5. The probe head of claim 1, wherein the Young's modulus of the lower section is greater than the Young's modulus of the upper section.

6. The probe head of claim 1, wherein the second spring constant is greater than the first spring constant.

7. The probe head of claim 1, wherein the Young's modulus of the lower guide plate is greater than the Young's modulus of the upper guide plate.

8. The probe head of claim 1, wherein the upper guide plate is disposed on the lower guide plate in a first direction, and the connection line of the first through hole with the second through hole is not parallel to the first direction.

9. The probe head of claim 1, wherein the probe structure body is a conductive structure body.

10. The probe head of claim 9, wherein electrical signals can be delivered from the first end portion to the second end portion.

11. The probe head of claim 9, wherein the probe structure body is monolithic.

12. The probe head of claim 1, wherein the first end portion has the degree of freedom to move along the penetrating direction of the first through hole.

13. A vertical probe card, comprising:
a probe head of claim 1;
a space transformer prepress-connected with the upper guide plate; and
a circuit board located on the space transformer and prepress-connected with the upper guide plate through the space transformer.

14. The vertical probe card of claim 13, wherein at least a part of the upper section exhibits a buckled state.

15. The vertical probe card of claim 14, wherein the lower section does not exhibit a buckled state.

* * * * *